(12) United States Patent
Brzesowsky et al.

(10) Patent No.: US 7,838,795 B2
(45) Date of Patent: Nov. 23, 2010

(54) METHOD OF BREAKING A BRITTLE SUBSTRATE

(75) Inventors: Rudolf Heinrich Brzesowsky, Eindhoven (NL); Abraham Rudolf Balkenende, Eindhoven (NL); Raymond Gijsbertus Anthonius Van Agthoven, Eindhoven (NL); Petrus Henricus Maria Timmermans, Eindhoven (NL); Nicolaas Petrus Willard, Eindhoven (NL)

(73) Assignee: Mitsuboshi Diamond Industrial Co., Ltd., Suita, Osaka (JP)

( * ) Notice: Subject to any disclaimer, the term of this patent is extended or adjusted under 35 U.S.C. 154(b) by 747 days.

(21) Appl. No.: 10/524,982

(22) PCT Filed: Jul. 18, 2003

(86) PCT No.: PCT/IB03/03271

§ 371 (c)(1),
(2), (4) Date: Feb. 18, 2005

(87) PCT Pub. No.: WO2004/018144

PCT Pub. Date: Mar. 4, 2004

(65) Prior Publication Data

US 2005/0263503 A1 Dec. 1, 2005

(30) Foreign Application Priority Data

Aug. 21, 2002 (EP) ................... 02078453

(51) Int. Cl.
*B23K 26/00* (2006.01)

(52) U.S. Cl. ............... 219/121.72; 219/121.84; 219/121.67

(58) Field of Classification Search ............ 219/121.72, 219/121.85, 121.84, 121.67; 508/110
See application file for complete search history.

(56) References Cited

U.S. PATENT DOCUMENTS 3,634,243 A * 1/1972 Wessels et al. ............. 508/156
3,833,502 A * 9/1974 Leary et al. ................ 508/507
4,897,153 A * 1/1990 Cole et al. .................... 216/18

(Continued)

*Primary Examiner*—M. Alexandra Elve
(74) *Attorney, Agent, or Firm*—Thorne & Halajian, LLP; Gregory L. Thorne

(57) ABSTRACT

The invention relates to a method of breaking a substrate of a brittle material, the method comprising the steps of providing a substrate (1) of a brittle material, heating the substrate with a laser beam (3) to create a heated spot on the substrate, moving the laser beam and the substrate with respect to each other to create a line of heated spots on the substrate (2), cooling the heated spots on the substrate by locally applying a cooling medium (4) behind the heated spots such that a micro-crack is propagated in the line of heated spots, and breaking the substrate along the line of the propagated microcracks by applying a mechanical force on the substrate wherein, the cooling medium comprises an aqueous surfactant solution. The surfactants will connect to the broken siloxane bonds inside the surface cracks. Then recombination and healing of the broken siloxane bonds will not occur and the required breaking load will remain constant over time.

19 Claims, 1 Drawing Sheet

U.S. PATENT DOCUMENTS

Figure 1:
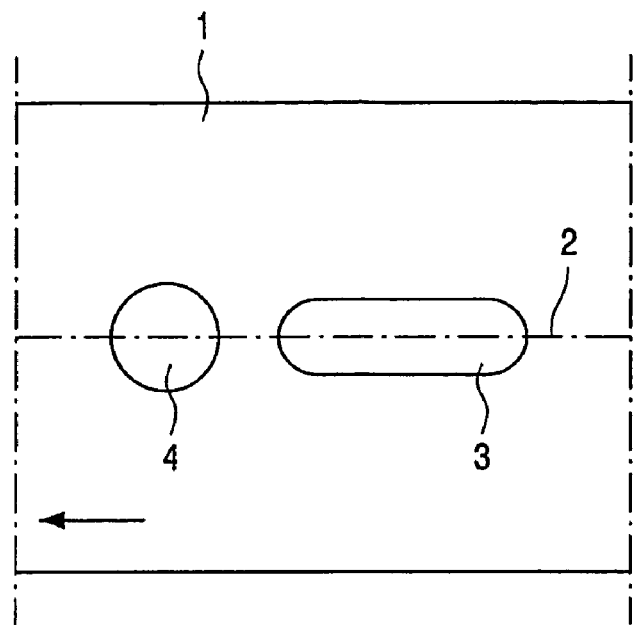

| | | | |
|---|---|---|---|
| 5,534,172 A * | 7/1996 | Perry et al. | 508/156 |
| 5,565,363 A * | 10/1996 | Iwata et al. | 436/2 |
| 5,916,460 A * | 6/1999 | Imoto et al. | 219/121.67 |
| 6,211,488 B1 * | 4/2001 | Hoekstra et al. | 219/121.72 |
| 6,232,274 B1 * | 5/2001 | Hughes et al. | 507/240 |
| 6,673,752 B2 * | 1/2004 | Bookbinder et al. | 508/206 |
| 7,109,152 B1 * | 9/2006 | Corby et al. | 508/183 |
| 7,253,017 B1 * | 8/2007 | Roscheisen et al. | 438/57 |
| 7,291,782 B2 * | 11/2007 | Sager et al. | 136/250 |
| 2002/0046997 A1 * | 4/2002 | Nam et al. | 219/121.72 |
| 2003/0052098 A1 | 3/2003 | Choo et al. | |

\* cited by examiner

METHOD OF BREAKING A BRITTLE SUBSTRATE

The invention relates to a method of breaking a substrate of brittle material, the method comprising the steps of providing a substrate of a brittle material, heating the substrate with a laser beam to create a heated spot on the substrate, moving the laser beam and the substrate with respect to each other to create a line of heated spots on the substrate, cooling the heated spots on the substrate by locally applying a cooling medium such that a micro-crack in the line of heated spots is propagated, and breaking the substrate along the line of micro-cracks by applying a force on the substrate.

Many products made from a brittle non-metallic material, e.g. glass and semi-conductor wafer materials, are formed by separating a piece, sheet, wafer, or panel into a number of smaller pieces of the desired size or sizes.

U.S. Pat. No. 6,252,197 discloses a method for physically separating brittle substrates by forming a micro-crack in the substrate and controllingly propagating the micro-crack. An initial mechanical or laser scribing device forms a micro-crack in the substrate. A laser beam is applied onto the substrate on a separation line. A coolant stream comprising a mixture of pressurized gas and water intersects with the trailing edge of the laser beam. The temperature differential between the heat affected zone of the substrate and the coolant stream propagates the micro-crack. By applying a mechanical load the substrate is subsequently broken into smaller pieces along the separation line, which may be further processed e.g. to produce display devices.

It is a problem connected to this method that the mechanical load necessary to further open the induced surface cracks increases with time, i.e. the mechanical load is higher the longer the time elapsed between the moment of inducing micro-cracks and the final breaking of the substrate into smaller pieces. This is undesired since in a factory it is often not possible to immediately break the substrates after they have been treated with the laser beam. In that case the subsequent breaking of the substrate results in damage of edges and a lower production yield.

It is an object of the invention to provide a breaking process in which the breaking load remains constant over time after the initiation of micro-cracks. To this end the method according to the invention is characterized in that the cooling medium comprises an aqueous surfactant solution. The inventors have realized that the increase of the breaking load in the conventional process is due to locking or even healing of the micro-cracks. However, if the cooling medium comprises an aqueous surfactant solution the surfactants will connect to the broken siloxane bonds inside the micro-cracks. Recombination and healing of the broken siloxane bonds will not occur and the required breaking load will remain constant over time. Furthermore, the surfactants will change (i.e. lower) the surface energy of the cracks. Consequently, the cracks will be kept open and the load needed to open the cracks will be lowered.

The dependent claims describe advantageous embodiments of the invention.

These and other objects of the invention will be apparent from and elucidated with reference to the embodiments described hereinafter.

Figure 2:
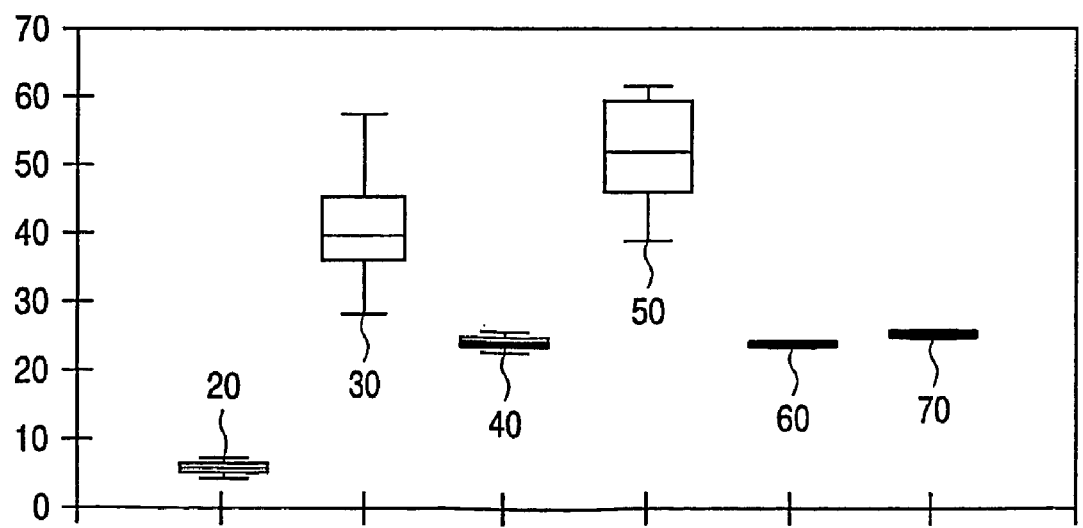

In the drawings:

FIG. 1 is a schematic view from above of an apparatus employing the method according the invention, and FIG. 2 shows results of load measurements for various cooling media and various elapsed times.

The figures are not drawn to scale. In the figures, like reference numerals generally refer to like parts.

FIG. 1 is a schematic view from above of an apparatus employing the method according to the invention. A spot 3 of a laser beam is focussed on substrate 1 of a brittle material, e.g. glass, crystalline silica, ceramics or compositions thereof. The energy contained in the laser spot 3 causes local heating of the substrate. A cooling medium from a nozzle 4 in the vicinity of the laser spot 3 (in most cases positioned behind the laser spot) cools the heated spot. This rapid temperature differential causes a thermal shock and causes a pre-existing micro-crack to propagate.

The substrate is moved with respect to the laser spot in a direction indicated by the arrow. Likewise, the laser beam may be moved with respect to the substrate in a direction opposite to the arrow. As a result of the relative movement the micro-crack is propagated along a separation line 2.

Next, the substrate 1 can be broken along the separation line 2 in a conventional way by exerting a mechanical load force to the substrate.

It has been observed that the mechanical load required to break the substrate depends on the amount of time elapsed between the formation of the micro-cracks and the moment of applying the mechanical load. FIG. 2 shows results of load measurements for various cooling media and various elapsed times. The data are provided with bars indicating the statistical spread on the measurements. Displayed is the required mechanical load (in Newton) for breaking the substrate in case of:

a spray mixture of air and ethanol as cooling medium, 30;

cooling by a spray mixture of air and water, and immediately followed by breaking, 40;

cooling by a spray mixture of air and water, and breaking after 12 hours, 50;

cooling by a spray mixture of air and an aqueous solution comprising 0.1% by weight of the surfactant cetyl trimethyl ammonium bromide (CTAB) and immediate breaking, 60;

cooling by a spray mixture of air and an solution of water comprising 0.1% by weight of the surfactant cetyl trimethyl ammonium bromide (CTAB) and breaking after 15 hours, 70.

For reasons of comparison the mechanical load for the conventional mechanical scribe process is also indicated, 20.

From the data shown in FIG. 2 it can be concluded that the mechanical load is reduced by almost a factor of 2 if CTAB is used and that the reduction remains if breaking occurs after 15 hours. Good process yield was obtained when the glass plates were further processed and LCD panels were made from them.

CTAB is a compound belonging to the class of cationic surfactants, i.e. a surface active agent, a substance such as a detergent that reduces the surface tension of a liquid. Good results were also obtained with compounds belonging to the classes of non-ionic and anionic surfactants, such as octadecyl deca(ethyleenoxide) hydroxide or dodecylbenzene sulfonic acid sodium salt, respectively. All compounds have in common their capability of binding to the broken siloxane bonds ('dangling bonds') inside the micro-cracks.

Good results were obtained when the compounds were present in the aqueous solution in the range of 0.01 to 1% by weight.

In summary, the invention relates to a method of breaking a substrate of brittle material, the method comprising the steps of providing a substrate I of a brittle material, heating the substrate with a laser beam 3 and creating a heated spot on the substrate, moving the laser beam and the substrate with respect to each other thus creating a line of heated spots on the substrate 2, cooling the heated spots on the substrate by locally applying a cooling medium 4 behind the heated spots such that a micro-crack is propagated in the line of heated spots, breaking the substrate along the line of the propagated micro-cracks by applying a mechanical force on the substrate wherein, the cooling medium comprises an aqueous surfactant solution.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The word "a" or "an" preceding an element does not exclude the presence of a plurality of such elements.

The invention claimed is:

1. A method of breaking a substrate of brittle material, the method comprising acts of:
    providing a substrate of a brittle material,
    focusing a laser beam on the substrate to heat the substrate with the laser beam to create a heated spot on the substrate,
    moving the laser beam and the substrate with respect to each other to create a line of heated spots on the substrate,
    selecting a cooling medium of an aqueous surfactant solution to bond to broken siloxane bonds as a micro-crack is formed on the substrate,
    cooling the heated spots on the substrate by locally applying the cooling medium such that the micro-crack is formed in the line of heated spots on the substrate, and
    breaking the substrate along the line of the micro-crack by applying a force on the substrate.

2. The method of breaking a substrate of brittle material according to claim 1, wherein the cooling medium further comprises air mixed with the aqueous surfactant solution.

3. The method of breaking a substrate of brittle material according to claim 1, wherein the concentration of the surfactant is in the range of 0.01 to 1% of weight.

4. The method of breaking a substrate of brittle material according to claim 1, wherein the aqueous surfactant solution comprises a cationic surfactant.

5. The method of breaking a substrate of brittle material according to claim 4, wherein the cationic surfactant comprises cetyl trimethyl ammonium bromide (CTAB).

6. The method of breaking a substrate of brittle material according to claim 1, wherein the aqueous surfactant solution comprises a nonionic surfactant.

7. The method of breaking a substrate of brittle material according to claim 6, wherein the nonionic surfactant comprises octadecyl deca(ethyleenoxide) hydroxide.

8. The method of breaking a substrate of brittle material according to claim 1, wherein the aqueous surfactant solution comprises an anionic surfactant.

9. The method of breaking a substrate of brittle material according to claim 8, wherein the anionic surfactant comprises dodecylbenzene sulfonic acid sodium salt.

10. The method of breaking a substrate of brittle material according to claim 1, wherein the brittle material comprises one or more of glass, crystalline silica and ceramics.

11. A method of breaking a substrate of brittle material, the method comprising acts of:
    providing a substrate of a brittle material,
    focusing a laser beam on an exposed surface of the substrate to heat the exposed surface of the substrate with the laser beam to create a heated spot on the exposed surface of the substrate,
    moving the laser beam and the substrate with respect to each other to create a line of heated spots on the exposed surface of the substrate,
    cooling the heated spots on the substrate by locally applying an aqueous surfactant solution such that a micro-crack in the line of heated spots is propagated on the exposed surface of the substrate and the aqueous surfactant solution enters the micro-crack, and
    breaking the substrate along the line of the propagated micro-crack by applying a force on the substrate, wherein the aqueous surfactant solution enters the micro-crack prior to the breaking act, wherein the aqueous surfactant solution is selected to bond to broken siloxane bonds in the micro-crack.

12. The method of breaking a substrate of brittle material according to claim 11, wherein the aqueous surfactant solution further comprises air mixed with the aqueous surfactant solution.

13. The method of breaking a substrate of brittle material according to claim 11, wherein the concentration of the aqueous surfactant solution is in the range of 0.01 to 1% of weight.

14. The method of breaking a substrate of brittle material according to claim 11, wherein the aqueous surfactant solution comprises a cationic surfactant.

15. The method of breaking a substrate of brittle material according to claim 14, wherein the cationic surfactant comprises cetyl trimethyl ammonium bromide (CTAB).

16. The method of breaking a substrate of brittle material according to claim 11, wherein the aqueous surfactant solution comprises a nonionic surfactant.

17. The method of breaking a substrate of brittle material according to claim 16, wherein the nonionic surfactant comprises octadecyl deca(ethyleenoxide) hydroxide.

18. The method of breaking a substrate of brittle material according to claim 11, wherein the aqueous surfactant solution comprises an anionic surfactant.

19. The method of breaking a substrate of brittle material according to claim 18, wherein the anionic surfactant comprises dodecylbenzene sulfonic acid sodium salt.

* * * * *